(12) United States Patent
Reial

(10) Patent No.: US 7,724,808 B2
(45) Date of Patent: May 25, 2010

(54) EFFICIENT DELAY PROFILE COMPUTATION WITH RECEIVE DIVERSITY

(75) Inventor: Andres Reial, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 716 days.

(21) Appl. No.: 11/614,622

(22) Filed: Dec. 21, 2006

(65) Prior Publication Data

US 2008/0151983 A1 Jun. 26, 2008

(51) Int. Cl.
*H04B 1/00* (2006.01)
(52) U.S. Cl. ....................................... 375/150
(58) Field of Classification Search ................ 375/148, 375/150, 260, 343, 347; 370/320, 335, 342, 370/441
See application file for complete search history.

(56) References Cited

U.S. PATENT DOCUMENTS

| | | | |
|---|---|---|---|
| 6,370,397 B1 * | 4/2002 | Popovic et al. | 455/561 |
| 6,731,622 B1 | 5/2004 | Frank et al. | |
| 6,799,055 B2 | 9/2004 | Heinila | |
| 7,433,390 B2 * | 10/2008 | Hepler et al. | 375/150 |
| 7,508,862 B2 * | 3/2009 | Bilgic et al. | 375/147 |
| 2002/0186852 A1 * | 12/2002 | Rademacher et al. | 381/94.1 |
| 2003/0133493 A1 | 7/2003 | Suzuki et al. | |
| 2004/0240479 A1 | 12/2004 | Bohnhoff | |
| 2005/0147064 A1 | 7/2005 | Nakagawa | |

FOREIGN PATENT DOCUMENTS

WO 96/27961 9/1996
WO 2004/049595 6/2004

OTHER PUBLICATIONS

Maljevic, Ivo et al., "Effects of Unresolvable Multipath on Mobile Terminals with Antenna Diversity in WCDMA system." The 14th IEEE 2003 International Symposium on Personal, Indoor and Mobile Radio Communications Porcessings, pp. 1593-1957.
D'Amico, Antonio Alberto et al., "DOA and Channel Parameter Estimation for Wideband CDMA Systems." IEEE Transactions on Wireless Communications, Nov. 2004, pp. 1942-1947, vol. 3, No. 6.
Holma, Harri et al., "Multipath Radio Channels and Rake Reception."WCDMA for UMTS: Radio Access for Third Generation Mobile Communications, 2000, pp. 30-34, Johnson Wiley & Sons, Ltd.

* cited by examiner

*Primary Examiner*—Don N Vo
(74) *Attorney, Agent, or Firm*—Coats & Bennett, P.L.L.C.

(57) ABSTRACT

An instantaneous power density profile (PDP) is generated by dynamically switching between signals from two or more antennae, each for a variable number of signal samples. A variable number $N_C$ of samples are correlated with a known chip code, the correlations phase-coherently accumulated, and a number $N_{NC}$ of such coherent accumulations is accumulated non-coherently for each of a plurality of delay values. The parameters considered in determining the dynamic switching pattern may include values of $N_C$ and $N_{NC}$, how often and at which point in the PDP generation process to switch between antennae, and other factors, such as the velocity of a transmitter. The coherent accumulations from each antenna may be weighted in response to the signal quality of the respective antenna, and the weighted coherent accumulations accumulated non-coherently.

19 Claims, 4 Drawing Sheets

EFFICIENT DELAY PROFILE COMPUTATION WITH RECEIVE DIVERSITY

BACKGROUND

Wireless communications systems are widely deployed, providing a variety of data and voice communication services to mobile subscribers. In Code Division Multiple Access (CDMA)-based systems, e.g. WCDMA, individual channels are formed by frequency-spreading individual communication signals with orthogonal or nearly orthogonal codes, and transmitting a plurality of spread signals simultaneously in the same broad frequency band. A receiver then correlates a received signal with a particular spreading code to recover the corresponding communication signal, and treats all other signals in the band as noise.

In wireless systems, the physical channel between terminals is formed by a radio link. In most cases, many different propagation paths exist between the terminals, due to reflections in the environment. The plurality of propagation paths gives rise to a multipath channel carrying several resolvable components. Because CDMA channels are extracted at a receiver by correlating a received signal with a known spreading code, the receiver performance is improved by utilizing the signal energy carried by many multipath components. This is traditionally achieved by using a RAKE receiver.

The RAKE receiver derives its name from its rake-like appearance, wherein multiple, parallel receiver fingers each receive the multipath signal. Each finger is provided with a reference copy of the spreading code that is delayed equally to the path delay of a corresponding multipath component. The finger outputs are then coherently combined to produce a symbol estimate. In this manner, the RAKE receiver utilizes multipath reception to improve the Signal-to-Noise Ratio (SNR) of the received multipath signal. RAKE receiver performance is optimized if the signal energy from all paths is utilized. To provide the properly delayed spreading code to each finger, the RAKE receiver requires knowledge of the multipath delays and the values of the channel impulse response for all paths.

The multipath delays of the radio channel may be found in a number of different ways. A traditional and efficient solution is based on the power delay profile (PDP) of the multipath channel. The PDP is produced by performing a sequence of correlation operations for each delay of interest, and indicates the detected signal energies at each delay. The PDP may then be inspected to determine the exact delays of the physical paths, possibly after additional processing, so that these delays may be provided to RAKE fingers. A known way to generate the PDP is to correlate the received sample sequence with a reference pilot channel (CPICH) chip sequence that is appropriately delayed. Each correlation result produces a PDP value for the given delay.

Destructive interference among multipath signal components gives rise to a phenomenon known as fast fading. For example, if two signal components arrive at an antenna along paths that differ in length by a half wavelength (or multiple thereof), they will be 180° out of phase, and will cancel each other out. Due to fading, the instantaneous PDP—one generated in a single activation period or PDP measuring period—may not indicate the presence of all the physical propagation paths, but only a subset. If the instantaneous PDP were used for RAKE finger placement without further processing, some positions or delay regions containing signal energy may not be accounted for, degrading the RAKE receiver's performance.

In order to avoid ignoring some of the paths, instantaneous PDPs may be averaged with previously calculated PDPS, in order to mitigate the fast fading effects. By using the filtered PDP, all signal paths that are physically present will be considered by the RAKE receiver, even if some of them happen to be invisible during the activation period producing the most recent instantaneous PDP. The averaging time constant must be chosen as a compromise between effectively mitigating fast fading and the ability to track the changes in the underlying path delays. Filtering that is too slow may fail to react to changes in the path profile, such as when a moving mobile terminal turns a corner and transmitted signals encounter a different reflection environment. On the other hand, filtering that is too fast may not sufficiently mitigate fading effects.

In addition to path searching, the PDP is also used for signal power measurements to be reported to the network, in order to aid the network in mobility management, such as handover decisions. The Received Signal Code Power (RSCP) and Received Signal Strength Indication (RSSI) metrics are computed based on the PDP. For the reporting purposes, the instantaneous PDP is used, since the reports must reflect the instantaneous fading state, not the average delay profile properties. Similar PDP computation is also required for the cell search process, when detecting the presence and the signal strength of other cells in the neighborhood of a mobile terminal.

A variety of advanced receiver types have been developed to improve the RAKE receiver performance. One such advanced receiver type is dual-antenna receiver, where a signal is received via two separate antennas, each having a separate RF and receiver front-end processing branch (e.g., DAC, filter, and the like). If the two antennae and receiver branches are sufficiently separated (both spatially and electrically), the fading effects, noise, and interference signal components on the two branches, as seen by the RAKE receiver, are substantially uncorrelated. A dual-antenna RAKE receiver exhibits improved performance due to the array gain (more signal energy is received) and the diversity gain (the probability of deep fades is reduced). As a result, the block error rate performance of the receiver is improved.

Just like the single-antenna receiver, a dual-antenna RAKE receiver requires knowledge of the multipath delays. On a mobile terminal, the receiver antenna separation is sufficiently small that the underlying delay profile from the transmit antenna to both receiver antennae is identical. Therefore, the same path search operation appropriate for a single-antenna receiver could, in principle, be utilized, whereby only one antenna input signal is used to produce the PDP. The long-term averaged, or filtered, version of this PDP would be applicable to both antenna branches. On the other hand, the availability of two (almost) independently faded input signals from the two receive antennas allows the effective probability of deep fades for the paths to be reduced. That is, for a given path to be invisible at a given time instant, it must be faded down at both antennae simultaneously—an outcome having a considerably lower probability than a fade at one antenna only. Accordingly, if both antennae are utilized, heavy filtering of the instantaneous PDP is not necessary and the dynamic tracking of the path delays may be improved.

Several receiver configurations and operating methods are known for generating a delay profile for a dual antenna receiver. As mentioned above, the signal from only one antenna may be used to generate a PDP that is used for signals from both antennae in a dual-antenna RAKE receiver, filtering the PDP to mitigate the effects of fading. This approach has the advantage of requiring only one PDP generation circuit, but requires long-term averaging to produce a fadingindependent average PDP. In addition, the instantaneous PDP from the second antenna is not available for the power measurement reports.

An alternative configuration utilizes two parallel PDP generation circuits operating simultaneously, with each generating an instantaneous PDP from the signal received at a different antenna. The two instantaneous PDPs may then be combined to generate a composite PDP. In this arrangement, an instantaneous PDP is available for both antennae for reporting power measurements, and a shorter averaging period is required for the filtered PDP due to the reduced probability of simultaneous deep fading. However, this configuration requires either two separate PDP generation circuits, or a single PDP generation circuit having twice the processing speed.

Still another configuration utilizes two antennae and two receiver front-end processing circuits, and one PDP generation circuit. The PDP generation circuit considers the samples from each antenna alternatively—on either a per-activation period or per-sample basis—and averages the results. This configuration requires only a single PDP generation circuit and reduces the filtered PDP averaging time. However, if the signals are switched on a per-activation period basis, the instantaneous path profile and the signal quality at the two antennae may differ and the input into the PDP averaging does not change smoothly, resulting in fluctuations of the averaged PDP. Additionally, the instantaneous PDP for one antenna will always be out of date. If the signals are switched on a per-sample basis, excessive data loss may occur, as some data is lost in each switching action due to the non-zero delay spread.

SUMMARY

According to one or more embodiments of the present invention, an instantaneous PDP is generated by dynamically switching between signals from two or more antennae, each for a variable number of signal samples. The parameters considered in determining the dynamic switching pattern may include the number $N_C$ of pilot symbol correlations phase-coherently accumulated, the number $N_{NC}$ of these coherent accumulations to accumulate non-coherently, how often and at which point in the PDP generation process to switch between antennae, and other factors, such as the velocity of a transmitter. The coherent accumulations from each antenna may be weighted in response to the signal quality of the respective antenna, and the weighted coherent accumulations accumulated non-coherently. Embodiments of the present invention may consider the signal at each antenna in power measurement reports and the instantaneous PDP, allow for a shorter PDP averaging period to mitigate the effects of fading, and produce a smoothly filtered output pattern, utilizing a single PDP generation circuit.

In one embodiment, the present invention relates to a method of computing a power density profile (PDP). A pilot signal comprising a sequence of known symbols is received at first and second antennae. For a variable number ($N_{NC}$) of times within the same activation period, a variable number ($N_C$) of pilot signal samples is dynamically selected from either the first or second antenna for processing; and a coherent accumulation of correlation results is calculated for the selected samples. An instantaneous PDP is computed by non-coherently accumulating the $N_{NC}$ coherent accumulations.

In another embodiment, the present invention relates to a receiver. The receiver includes a first signal reception path comprising a first antenna and first receiver front-end circuit, and a second signal reception path comprising a second antenna and second receiver front-end circuit. The receiver also includes a power density profile (PDP) computation circuit operative to calculate an instantaneous PDP for a plurality of delay values based on a received pilot signal. The receiver further includes a switching circuit operative to direct signal samples from either the first or second signal reception path to the PDP computation circuit, and switching control logic directing the switching circuit to dynamically select a variable number $N_C$ of samples from either the first or second signal reception path.

In yet another embodiment, the present invention relates to a wireless communication system mobile terminal. The mobile terminal includes a first antenna operatively connected to a first receiver front-end circuit, and a second antenna operatively connected to a second receiver front-end circuit. The mobile terminal also includes a power density profile (PDP) generating circuit operative to calculate an instantaneous PDP for a plurality of delay values based on a received pilot signal. The mobile terminal further includes a switching circuit operative to direct signal samples from either the first or second receiver front-end circuit to the PDP computation circuit, and switching control logic directing the switching circuit to dynamically select a variable number $N_C$ of samples from either the first or second signal reception path.

DETAILED DESCRIPTION

Figure 1:
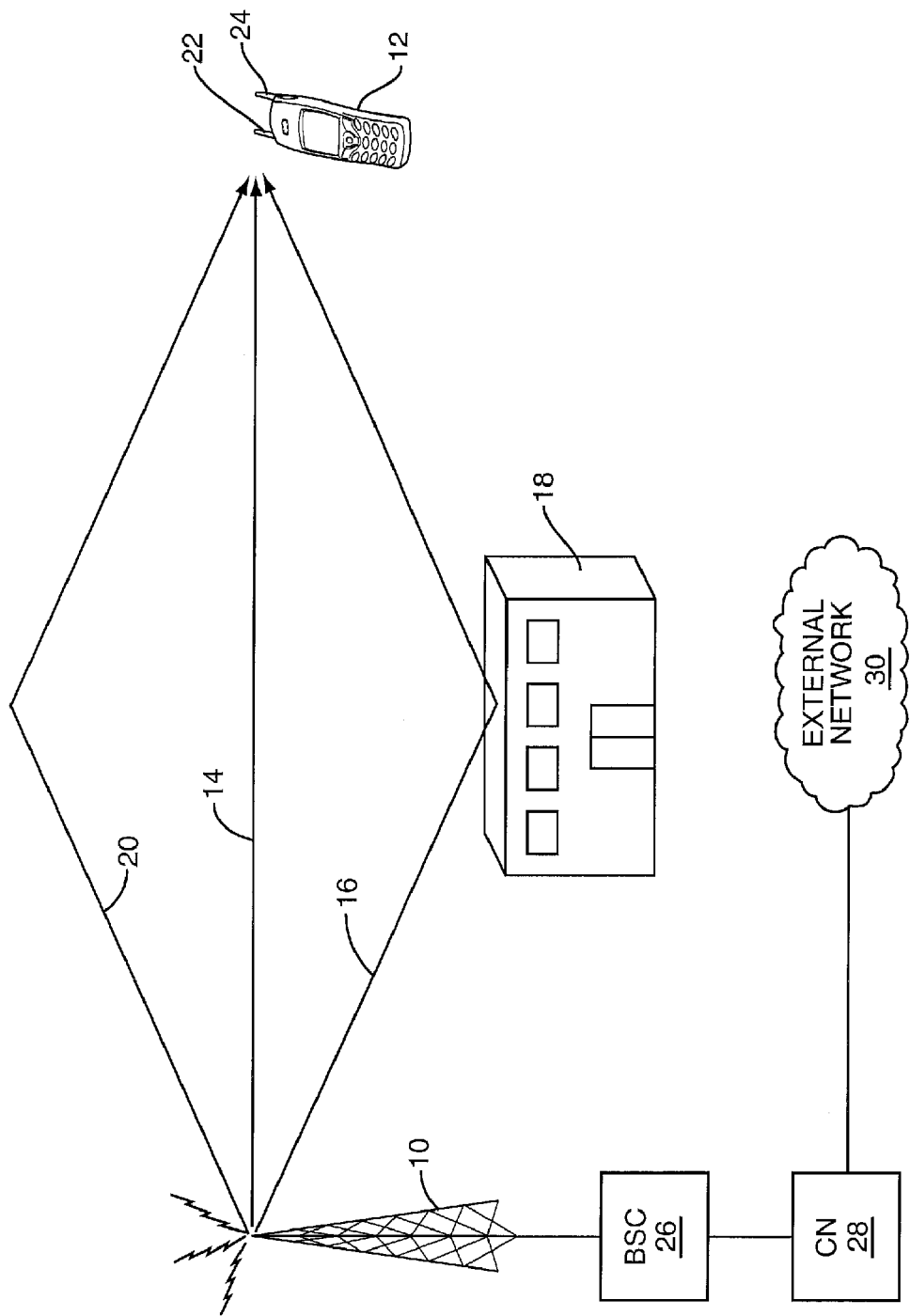
FIG. 1 is a diagram of multipath signal propagation from a base station to a mobile terminal.

FIG. 1 depicts multipath signal propagation in the forward link of a wireless communication system—that is, transmission from a Base Transceiver Station (BTS) 10, also known as a Radio Base Station (RBS), to a mobile terminal 12. In addition to a direct transmission path 14, FIG. 1 depicts a multipath component 16 reflected from a building 18 and a multipath component 20 reflected from an atmospheric or thermal boundary. As known in the art, additional multipath components may reach the mobile terminal 12 after being reflected from terrain or other objects. Due to the different path lengths, the multipath components 14, 16, 20 arrive at the antennae 22, 24 of the mobile terminal 12 with different delays.

The BTS/RBS 10 contains the radio transceivers necessary to effect wireless communication to mobile subscribers within a region, known in the art as a cell or sector. The BTS/RBS 10 is controlled by a Base Station Controller (BSC) 26, which may control plurality of other BTS/RBS (not shown). The combination of a BSC 26 and BTS/RBS 10 is referred to herein as a base station. The BSC 26 is connected through a Core Network (CN) 28 to one or more external networks 30, such as the Public Telephone Switched Network (PTSN) or the Internet.

Figure 2:
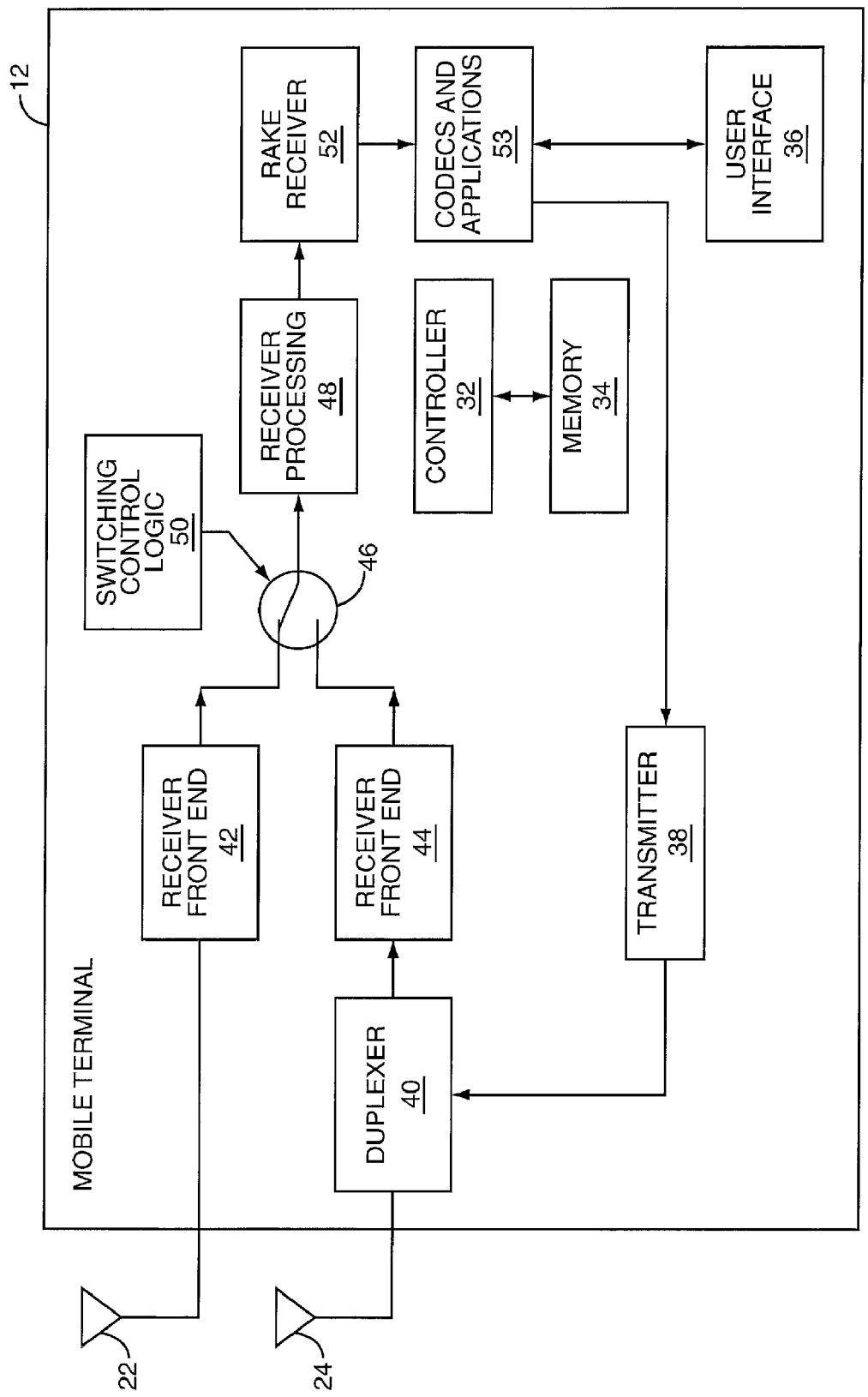
FIG. 2 is a functional block diagram of a dual-antenna mobile terminal.

FIG. 2 is a functional block diagram of the mobile terminal 12, according to one embodiment of the present invention. The mobile terminal 12 includes a controller 32, functionally coupled to memory 34, which controls the overall operation of the mobile terminal 12. Accordingly, although not depicted in FIG. 2, the controller 32 is operatively connected to every functional block. The controller 32 may comprise one or more microprocessors, a Digital Signal Processor (DSP), a state machine, or other computational and/or logical processing circuit, as known in the art. The controller 32 is operative to execute program instructions stored in memory 34, which may comprise SRAM, DRAM, SDRAM, ROM, PROM, Flash, optical or magnetic media, or the like, or any combination thereof, as known in the art. Those of skill in the art will readily recognize of that some or all of the functionality described herein with respect to any functional block, or characterized as a "circuit," may be implemented as software stored in memory 34 and executed by the controller 32.

The mobile terminal 12 includes a user interface 36, which may in various embodiments comprise input/output elements such as a keypad or keyboard, an alphanumeric and/or graphic display, microphone, speaker, and the like. The user interface 36 may additionally include further interfaces such as a Universal Serial Bus (USB) port, a Bluetooth transceiver, or the like, allowing for voice and/or data transfer to and from other devices. The user interface 36 interacts with various codecs and applications 53. The codecs and applications 53 provide to a transmitter 38 the electrical signals representing voice and/or data to be transmitted by the mobile terminal 12. The transmitter 38 is a fully functional transmitter appropriate to the relevant air interface. In particular, the transmitter 38 may include logic and circuits for encoding, spreading, modulating, and amplifying signals received from the user interface 36 or the controller 32 for transmission. The transmitter 38 is connected to at least one antenna (24, as depicted in FIG. 2) through a duplexer 40.

Antennae 22, 24 are connected to respective receiver front-end circuits 42, 44, that include circuits and logic for RF downconverting, digitizing, and digitally filtering received signals. Digitized samples are selected from one antenna 22, 24 by a switching circuit 46, and provided to receiver processing circuits 48. The switching circuit 46 operates under the control of switching control logic 50. The receiver processing circuit 48 further processes received signals, and provides the processed received signals and information extracted from them, such as multipath delays, to a RAKE receiver 52 for demodulating. The received data is then forwarded to codecs and applications 53 for processing and output to the user, such as via the speaker and/or display of the user interface 36.

Figure 3:
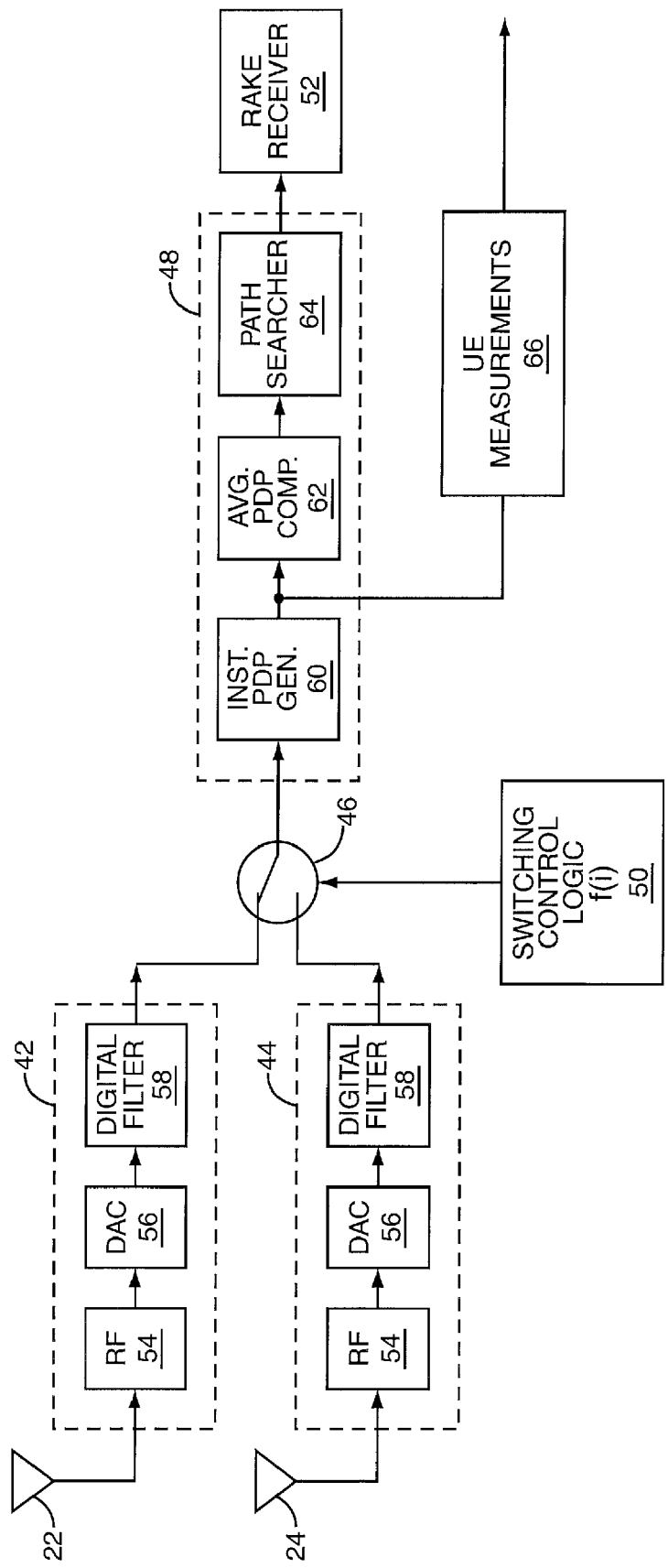
FIG. 3 is a functional block diagram of a dual-antenna receiver.

FIG. 3 depicts, in greater detail, the receiver front-end circuits 42, 44 and the receiver processing circuit 48. While FIG. 2 depicts these functional blocks in the context of a mobile terminal 12, those of skill in the art will recognize that the inventive receiver is not limited to the application. Accordingly, the circuits of FIG. 3 and their concomitant functionality may be advantageously deployed in any wireless communication receiver, such as those located in the BST/RBS 10 (see FIG. 1).

The receiver front-end circuits 42, 44 each comprise functional blocks such as an RF downconverting circuit 54 operative to convert received signals to baseband, a Digital to Analog Converter (DAC) operative to digitize the baseband signal into discrete samples, and a digital filter circuit 58 operative to further process the digitized samples. Those of skill in the art will recognize that the front-end receiver circuits 42, 44 may include additional functions and circuits not depicted in FIG. 3.

As described above, switching circuit 46, under the control of switching control logic 50, dynamically selects one or more samples from one of the receiver front-end circuits 42, 44, and provides the selected samples to an instantaneous power delay profile (PDP) generating circuit 60. As described in greater detail herein, the instantaneous PDP generating circuit 16 calculates non-coherent accumulations of (possibly weighted) coherent accumulations of correlations between known spreading/scrambling codes and received signal samples dynamically selected from receiver front-end circuit 42 or 44.

The instantaneous PDP are filtered in the average PDP computation circuit 62 to mitigate the effects of fading, and are provided to a path searcher circuit 64 for analysis and the detection and calculation of path delays. The path searcher 64 provides path delays to the RAKE receiver 52, which demodulates and decodes the multipath signal components by coherently combining the components for improved receiver performance.

The instantaneous PDPs are also utilized by the User Equipment (UE) measurement and reporting circuit 66, to provide code power (RSCP) and signal strength (RSSI) measurements to the wireless communication network, to assist in mobility management and other aspects of network operation and maintenance.

Figure 4:
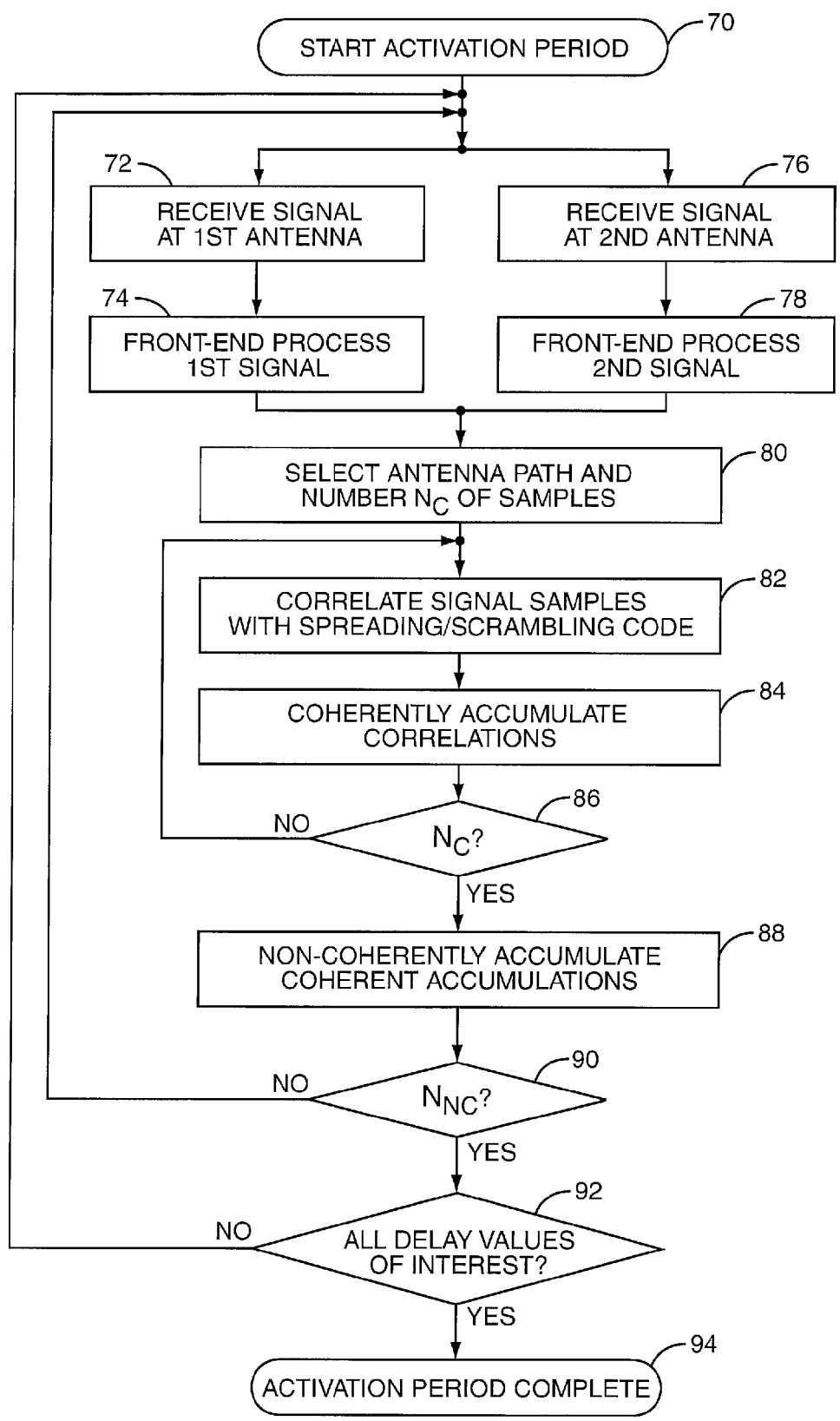
FIG. 4 is a flow diagram depicting a method of generating an instantaneous PDP.

Turning to the functionality of the instantaneous PDP generation circuit 60 and the switching control logic 50, in general, the instantaneous PDP for single-antenna receiver for the $n^{th}$ activation or measurement period is $p_s^{(n)} = \lfloor p_{s,0}^{(n)} \ldots p_{s,d}^{(n)} \ldots p_{s,D-1}^{(n)} \rfloor$. FIG. 4 depicts a method of calculating the instantaneous PDP. An activation period begins (block 70), and signals are received at the first antenna (block 72) and front-end processed (block 74). The signals are also received at the second antenna (block 76) and front-end processed (block 78). Although depicted as discrete steps, those of skill in the art will recognize that the activity described in blocks 72-78 is a continuous process. Under the direction of switching control logic 50, the switching circuit 46 selects a variable number $N_C$ of samples from either the first or second antenna path (block 80). The power value for a given delay d in the PDP is generated as $$p_{s,d}^{(n)} = \sum_{i=0}^{N_{NC}-1} \left| \sum_{j=0}^{N_C-1} s_{d,iN_C+j,0}^{(n)} \right| \quad (1)$$

where $s_{d,k,a}^{(n)}$ is the correlation value, computed from the received sample sequence y for antenna a, and the appropriately delayed CPICH chip sequence c, which includes both spreading and scrambling codes, $$s_{d,k,a}^{(n)} = \sum_{i=0}^{SF-1} y_{l+k \cdot SF,a} c_{1-t(d)+k \cdot SF} \quad (2)$$

As seen in (1), the correlation s between received signal samples (which are complex values) and the appropriately delayed spreading code is calculated (block 82) and the correlation values are phase-coherently accumulated (block 84) for a number $N_C$ of samples (the inner summation) (block 86). The phase coherence is necessary to avoid destructive phase interference. However, due to rapidly changing channel conditions, the correlations can only be coherently accumulated for a brief duration. Successive coherent accumulations are then non-coherently accumulated (block 88) a number $N_{NC}$ of times (the outer summation) (block 90) to generate the power value for each delay. This process is repeated over all delay values of interest (block 92) to build the instantaneous power delay profile, at which point the activation period ends (block 94).

According to the present invention, the switching control logic 50 dynamically directs the switching circuit to select samples from one or the other of the receiver front-end circuits 42, 44 for coherent accumulation of correlations in the instantaneous PDP generating circuit 60. Mathematically, this means that, when computing the multi-antenna PDP, the antenna index in (1) is a function of the non-coherent term index i:

$$p_{s,d}^{(n)} = \sum_{i=0}^{N_{NC}-1} w(f(i)) \left| \sum_{j=0}^{N_C-1} s_{d,iN_C+j,f(i)}^{(n)} \right| \quad (3)$$

The switching function $f(i)$ is implementation-specific, and may be programmable and hence dynamic. The function $f(i)$ may consider a variety of factors, including the number $N_C$ of CPICH symbols to accumulate coherently, the number $N_{NC}$ of coherent accumulations to accumulate non-coherently, the number and timing of antenna switches, and other factors, such as the velocity of a transmitter. Several rules of thumb may be observed regarding the switching function $f(i)$. In general, a larger $N_C$ yields better PDP quality for the same total measurement period. However, $N_C$ cannot be too large at high transmitter speeds (such as, for example, a mobile terminal in a vehicle). Antenna switching ideally should be done as often as possible; however, the slight loss of data caused by each switching instance places a ceiling on switching frequency. Those of skill in the art will be able to ascertain the appropriate balance between the benefits of frequent antenna switching and the data loss that switching incurs for any given implementation.

One limitation is that antenna switching must be done at multiples of $N_C$ symbols. That is, the switching point must be aligned with the coherent combining boundaries and not occur during any ongoing coherent combining period. Additionally, to obtain a significant diversity gain in the PDP computation, antenna switching should be done at least once per path searcher activation. A significant advantage of at least one embodiment of the present invention is that the switching function $f(i)$ is itself dynamic, and may be altered as conditions warrant. As those of skill in the art will readily recognize, the switching control logic 50 may be implemented in software executing on the controller 32, and hence a virtually limitless variety of switching frequencies and patterns are possible.

In some implementations, not all receiver antennae provide the same signal quality. To avoid degradation of the SNR in the computed PDP, each input term may be weighted by an antenna-specific weight factor w(a), to maximize the resulting SNR. The weight value w(a) for each antenna may be fixed or dynamically determined.

The filtering of the instantaneous PDP, to mitigate the effects of fading, may be accomplished in a variety of ways, as known in the art. In one embodiment, the filtering may be accomplished by exponential smoothing, $$\bar{p}_m^{(n)} = \alpha \bar{p}_m^{(n-1)} + (1-\alpha) p_m^{(n)} \quad (4)$$

The value of α may be significantly lower than one appropriate for a single-antenna configuration, thereby improving the tracking of changing delay values.

According to the logic, circuits, and methods of the present invention, PDP generation may capture many benefits of a dual-antenna configuration, while requiring only the hardware resources required for a single-antenna configuration. The primary benefit is the Rx diversity gain (the probability of deep fades is reduced). The instantaneous PDP—which may be used directly for UE measurement reporting on RSCP and RSSI—incorporates up-to-date information from all antenna branches. Less filtering of the PDP is necessary to mitigate fading effects, allowing for better tracking of path delay changes. The switching function $f(i)$ is tunable, and may include weighting, to maintain optimal combining even if the different antenna branches have different signal quality. In particular, $f(i)$ may be tuned to match the speed of the fading process.

Although the present invention has been described in the context of a path searcher, those of skill in the art will recognize that it is equally applicable to the cell searcher function. The only principal difference between them is the range of delays t(d) and the reference scrambling code embedded in $c_m$—the diversity gain is equally applicable and advantageous in both cases. Furthermore, although the inventive receiver circuits and functionality have been described in a mobile terminal 12, the receiver may be advantageously deployed in other Radio Access Network (RAN) entities, such as the BTS/RBS 10.

As used herein, the term "instantaneous PDP" refers to the power delay profile produced during one PDP generation circuit 60 activation period (i.e., a non-coherent accumulation of coherent accumulations of correlations) and reflects the information available during one activation period. In one embodiment, an activation period may be every one or few WCDMA time slots. As used herein, the term "average PDP" refers to the filtered PDP output by the average PDP computation circuit 62, which accumulates instantaneous PDPs over longer intervals. In one embodiment, the average PDP may be calculated over several or tens of WCDMA frames. As used herein, the term "dynamically" selecting an antenna path and/or a variable number of samples refers to an adaptive selection—that is, a selection based on changing conditions and parameters, wherein the decision may (or may not) change from one accumulation to the next.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of computing a power density profile (PDP), comprising:
    receiving a pilot signal comprising a sequence of known symbols at first and second antennae;
    for a variable number ($N_{NC}$) of times within the same activation period,
        dynamically selecting a variable number ($N_C$) of pilot signal samples from either the first or second antenna for processing; and
        calculating a coherent accumulation of correlation results for the selected samples; and
    computing an instantaneous PDP by non-coherently accumulating the $N_{NC}$ coherent accumulations.

2. The method of claim 1 wherein calculating a coherent accumulation of correlation results comprises calculating a phase-coherent accumulation of the results of a plurality of correlation operations between the received signal and a chip sequence over one or more selected samples.

3. The method of claim 2 wherein the chip sequence includes both spreading and scrambling codes.

4. The method of claim 1 wherein all method steps are repeated for each of a plurality of delay values, with the chip sequence being correspondingly delayed for each iteration.

5. The method of claim 1 wherein each coherent accumulation is calculated only over samples received at the same antenna.

6. The method of claim 1 wherein dynamically non-coherently accumulating the $N_{NC}$ coherent accumulations comprises:
   assigning combining weights to coherent accumulations of samples from the first and second antennae in response to the respective antenna signal quality; and
   non-coherently accumulating the $N_{NC}$ weighted coherent accumulations.

7. The method of claim 1 wherein the number $N_C$ of samples coherently accumulated varies inversely with the velocity of the transmitter transmitting the pilot signal.

8. The method of claim 1 wherein dynamically selecting $N_C$ samples from either the first or second antenna for processing comprises selecting one or more samples from each of the first and second antennae during the same activation period.

9. The method of claim 1 further comprising filtering the instantaneous PDP by averaging it with one or more previously calculated instantaneous PDPs to generate an average PDP.

10. The method of claim 1 further comprising using the PDP to ascertain one or more multipath delay values for the pilot signal.

11. The method of claim 1 further comprising using the PDP to find one or more base stations.

12. A receiver, comprising:
   a first signal reception path comprising a first antenna and first receiver front-end circuit;
   a second signal reception path comprising a second antenna and second receiver front-end circuit;
   a power density profile (PDP) generating circuit operative to calculate an instantaneous PDP for a plurality of delay values based on a received pilot signal;
   a switching circuit operative to direct signal samples from either the first or second signal reception path to the PDP computation circuit; and
   switching control logic directing the switching circuit to dynamically select a variable number $N_C$ of samples from either the first or second signal reception path.

13. The receiver of claim 12 further comprising a PDP filter circuit connected to the PDP generating circuit and operative to smooth the instantaneous PDP values by combination with stored PDP values.

14. The receiver of claim 13 further comprising a path searcher circuit connected to the PDP filter circuit and operative to discern multipath signals in the received signal.

15. The receiver of claim 14 further comprising a RAKE receiver connected to the path searcher circuit and operative to despread received multipath signals.

16. The receiver of claim 12 further comprising a received signal power measurement and reporting circuit connected to the PDP generating circuit.

17. The receiver of claim 12 wherein the PDP generating circuit and/or switching control logic are implemented as software instructions.

18. The receiver of claim 12 further comprising:
   a third signal reception path comprising a third antenna and third receiver front-end circuit; and
   wherein the switching circuit is operative to select between the first, second, or third signal reception paths; and
   wherein the switching control logic is operative to direct the switching circuit to dynamically select a variable number $N_C$ of samples from either the first, second, or third signal reception path.

19. A wireless communication system mobile terminal, comprising:
   a first antenna operatively connected to a first receiver front-end circuit;
   a second antenna operatively connected to a second receiver front-end circuit;
   a power density profile (PDP) generating circuit operative to calculate an instantaneous PDP for a plurality of delay values based on a received pilot signal;
   a switching circuit operative to direct signal samples from either the first or second receiver front-end circuit to the PDP computation circuit; and
   switching control logic directing the switching circuit to dynamically select a variable number $N_C$ of samples from either the first or second signal reception path.

* * * * *